(12) United States Patent
Scheyer (10) Patent No.: US 7,765,706 B2
(45) Date of Patent: Aug. 3, 2010

(54) LEVEL

(75) Inventor: Wolfgang Scheyer, Götzis (AT)

(73) Assignee: Sola-Messwerkzeuge GmbH, Gotzis (AT)

( * ) Notice: Subject to any disclaimer, the term of this patent is extended or adjusted under 35 U.S.C. 154(b) by 0 days.

(21) Appl. No.: 11/043,421

(22) Filed: Jan. 26, 2005

(65) Prior Publication Data

US 2005/0160610 A1  Jul. 28, 2005

(30) Foreign Application Priority Data

Jan. 28, 2004   (AT) .............................. A 112/2004

(51) Int. Cl.
  *G01C 9/28* (2006.01)
(52) U.S. Cl. ....................................... 33/379
(58) Field of Classification Search ................... 33/451, 33/377, 379–390
  See application file for complete search history.

(56) References Cited

U.S. PATENT DOCUMENTS 1,393,328 A * 10/1921 Thullen ........................ 33/381
1,624,161 A *  4/1927 Day ............................. 33/385

FOREIGN PATENT DOCUMENTS

| DE | 31 27 399 |    | 1/1983 |
| DE | 3432911 A1 | * | 3/1986 |
| DE | 36 06 774 |    | 9/1987 |
| JP | 11183167 A | * | 7/1999 |
| JP | 11183169 A | * | 7/1999 |
| WO | WO9713119 A1 | * | 4/1997 |

* cited by examiner

*Primary Examiner*—R. Alexander Smith
(74) *Attorney, Agent, or Firm*—Wenderoth, Lind & Ponack, L.L.P.

(57) ABSTRACT

A level has a level body made of a hollow profiled section having a bottom wall whose underside forms a measuring surface and further having a top wall and sidewalls, the sidewalls connecting the bottom wall and the top wall. The level body has a window opening for receiving a horizontal vial for horizontal measurement. A securing device for mounting the horizontal vial within the level body is provided. The securing device has a vial holder, in which the horizontal vial is secured, and at least one clamping part that is movable relative to the vial holder for clamping the securing device in the level body. In the mounted state of the securing device, the at least one clamping part is supported on an inner side of the top wall and the vial holder is pressed against an inner side of the bottom wall.

22 Claims, 7 Drawing Sheets

LEVEL

BACKGROUND OF THE INVENTION

1. Field of the Invention

The invention relates to a level comprised of a level body that is made of a hollow profiled section and has a bottom wall whose underside forms a measuring surface. The level body further has a top wall and sidewalls connecting the bottom wall and the top wall. The level further comprises a horizontal vial for carrying out a horizontal measurement. The vial is arranged within a window opening of the level body and is mounted in the level body by means of a securing device. The securing device secures a vial holder that holds the horizontal vial and has at least one clamping part that is movable relative to the vial holder for clamping the securing device within the level body.

2. Description of the Related Art

A level of the aforementioned kind is disclosed in German patent 36 06 774 C2. The vial holder has spreading cams that cooperate with spreading bodies that form clamping parts. By moving the spreading bodies, starting from a passive position, into their active position, the spreading cams are forced against the inner sides of the sidewalls of the level body so that the securing device for the horizontal vial is clamped within the level body. The device according to German patent 36 06 774 C2 provides for a simple assembly of the securing device for the horizontal vial within the level body, but it was found that upon temperature fluctuations the adjustment of the vial relative to the measuring surface of the level body can not be optimally maintained. Also, tolerances of the profile cross-section of the level body and of the parts of the securing device can be compensated only to a limited extent.

In addition, securing devices for horizontal vials are known that are glued into the level body or are snapped into place into a recess within the level body. In these devices there is also the problem that the measuring precision is affected by temperature fluctuations.

Moreover, a securing device is known with which the vial holder inserted into the window opening is pressed by means of a clamping part that is adjustable by a clamping screw against the inner side of the top wall of the hollow profiled section. The adjustment of the vial relative to the level body is realized in this connection by a minimal plastic deformation in the sense of depressing the top wall of the level body in an area in which the vial holder is pressed against the top wall. The temperature behavior of this securing device relative to the afore described securing devices is improved, but the assembly and adjustment are relatively complex. Also,. subsequent deformations of the top wall (for example, by impacts during the course of use of the level) have a direct effect on the adjustment of the horizontal vial relative to the measuring surface.

SUMMARY OF THE INVENTION

It is an object of the present invention to provide a level whose measuring precision of the horizontal vial is affected as little as possible by temperature fluctuations.

In accordance with the present invention, this is achieved in that the level comprises:

a level body that is comprised of a hollow profiled section having a bottom wall whose underside forms the measuring surface and further having a top wall and sidewalls connecting the bottom wall and the top wall;

a horizontal vial for horizontal measurement that is arranged within a window opening of the level body;

a securing device for mounting the horizontal vial within the level body, wherein the securing device comprises a vial holder, in which the horizontal vial is secured, and at least one clamping part that is movable relative to the vial holder for clamping the securing device in the level body;

wherein in the clamped (or mounted) state of the securing device the at least one clamping part is supported on the inner side of the top wall and the vial holder is pressed against the inner side of the bottom wall.

Since the at least one clamping part presses the vial holder against the inner side of the bottom wall whose underside forms the measuring surface, the effect on the measuring precision can be kept very small despite different expansion coefficient values of the different parts (level body, vial holder, clamping part, and vial). Different expansion coefficient values of the level body, the vial holder, and the clamping part can be compensated advantageously by a flexible (bendable) configuration of the clamping part. Also, cross-sectional tolerances of the level body and tolerances of the insertion parts (vial holder and clamping part) can be compensated by a flexible (bendable) configuration of the clamping part.

In a preferred embodiment of the invention, the clamping part is a U-shaped bracket and has two arms that are connected by a connecting leg, wherein the ends of the arms remote from the connecting leg are supported on the inner side of the top wall on both sides of the window opening (relative to the longitudinal extension of the level body). In this connection, in the mounted state of the securing device, the connecting leg can be connected to the vial holder (for example, by a snap connection) and can be elastically bent, wherein it exerts a pressing force onto the vial holder by which the vial holder is forced against the bottom wall of the level body.

Preferably, in the mounted (=clamped) state of the securing device the at least one clamping part is connected (=locked) to the vial holder by a snap connection. This enables a very simple assembly of the securing device within the level body.

Further advantages and details of the invention will be explained in the following with the aid of the embodiments illustrated in the drawing from which further features of the invention can be taken.

DESCRIPTION OF THE PREFERRED EMBODIMENTS

A first embodiment of the invention is illustrated in FIGS. 1 through 15. The level has a level body 1 that is made of a hollow profiled section and has a bottom wall 2, a top wall 3, and side walls 4, 5 that connect the bottom wall 2 and the top wall 3 with one another. The underside of the bottom wall 2 forms a measuring surface 6. For performing a horizontal measurement, he level has a horizontal vial 7 that is arranged in a window opening 8 of the level body 1. For this purpose, a securing device 9 is provided. In the illustrated embodiment, as is conventional in the art in connection with levels, the level has a vertical vial 10 for performing a vertical measurement. The latter is also secured in a window opening within the level body by means of a securing device. The configuration of the securing device of the vertical vial is inconsequential in connection with the present invention and is therefore not explained in this context. This securing device for a vertical vial can be of a conventional configuration known in the art. In principle, a vertical vial could also be omitted. End caps 50 can be inserted into the ends of the level body 1.

The horizontal vial 7 can be configured as is known in the art and can comprise a vial body 11 with a barrel-shaped hollow space into which the vial liquid is filled so that it contains a bubble 12. For marking the horizontal position the vial body 11 is provided with marking rings 13. The vial body 11 is glued into a frame 14 that surrounds the end faces and the bottom side of the vial body 11 and is thus U-shaped in a side view.

The vial body 11 in the illustrated embodiment is a so-called relatively thick-walled "block vial"; such vials are produced such that the vial body is initially injection molded as a cylindrical hollow member or a hollow member that is slightly conical toward an end that is sealed later and the hollow body is then machined to a barrel shape. Also, a configuration as a so-called "tube vial" is conceivable and possible where a relatively thin-walled vial body is injection molded to have a barrel-shaped hollow space from the start and the vial body is then forcibly removed from the mold.

The securing device 9 for the horizontal vial 7 comprises a holder 15 and a clamping part 16. The vial holder 15 has support legs 17 whose free ends in the mounted state (clamped state) of the securing device 9 are pressed against the inner side of the bottom wall 2. Moreover, the vial holder 15 has a receptacle 18 for the horizontal vial 7. The receptacle 18 is delimited by a bottom part 19 and by end members 20, 21 provided, relative to the longitudinal direction of the level, at both ends of the bottom part 19. Flange stays 22 project from the lateral edges of the end members 20, 21 and, in the inserted state of the horizontal vial, they overlap vertical sections of the frame 14. The two support legs 17 on the respective longitudinal sides of the vial holder 15 are connected to one another by a bridge section 23 in which first and second locking recesses 24, 25 are arranged.

In the bottom part 19 a through opening 26 and a transversely extending groove 27 are provided. In the mounted state of the horizontal vial 7, a pivot stay 28 is positioned in this groove 27; the pivot stay 28 is provided on the underside of the frame 14 wherein the height of the pivot stay 28 is greater than the depth of the groove 27.

The clamping part 16 is a U-shaped bracket when viewed in a side view and has two arms 29, 30 which in the mounted state of the securing device 9 define an angle 32 of less than 45° relative to a normal line 31 to the measuring surface 6; this angle 32 is preferably less than 20°, and a value of less than 10° is especially preferred. The arms 29, 30 are connected to one another by a connecting leg 33 that extends in the longitudinal direction of the level body 1. The free ends 34, 35 of the arms 29, 30 facing away from the connected leg 33 in the mounted state of the securing device 9 are supported on the inner side of the top wall 3.

In the illustrated embodiment, the connecting leg 33 is provided in the central area of its longitudinal extension with two hook parts 36. In the mounted state of the securing device 9 the two hook parts 36 are snapped into place in the two first locking recesses 24 of the bridge section 23. In a pre-locking position in which the securing device 9 is inserted into the window opening 8 for mounting (compare FIG. 15), the hook parts 36 are snapped into the second locking recesses 25 wherein these second locking recesses 25 have a smaller height than the first locking recesses 24 so that the hook parts 36 will not snap into place with the entire length 1 (illustrated in FIG. 6) of their wedge-shaped locking noses but only with a portion of their length 1 (compare, for example, FIG. 10).

Figure 1:
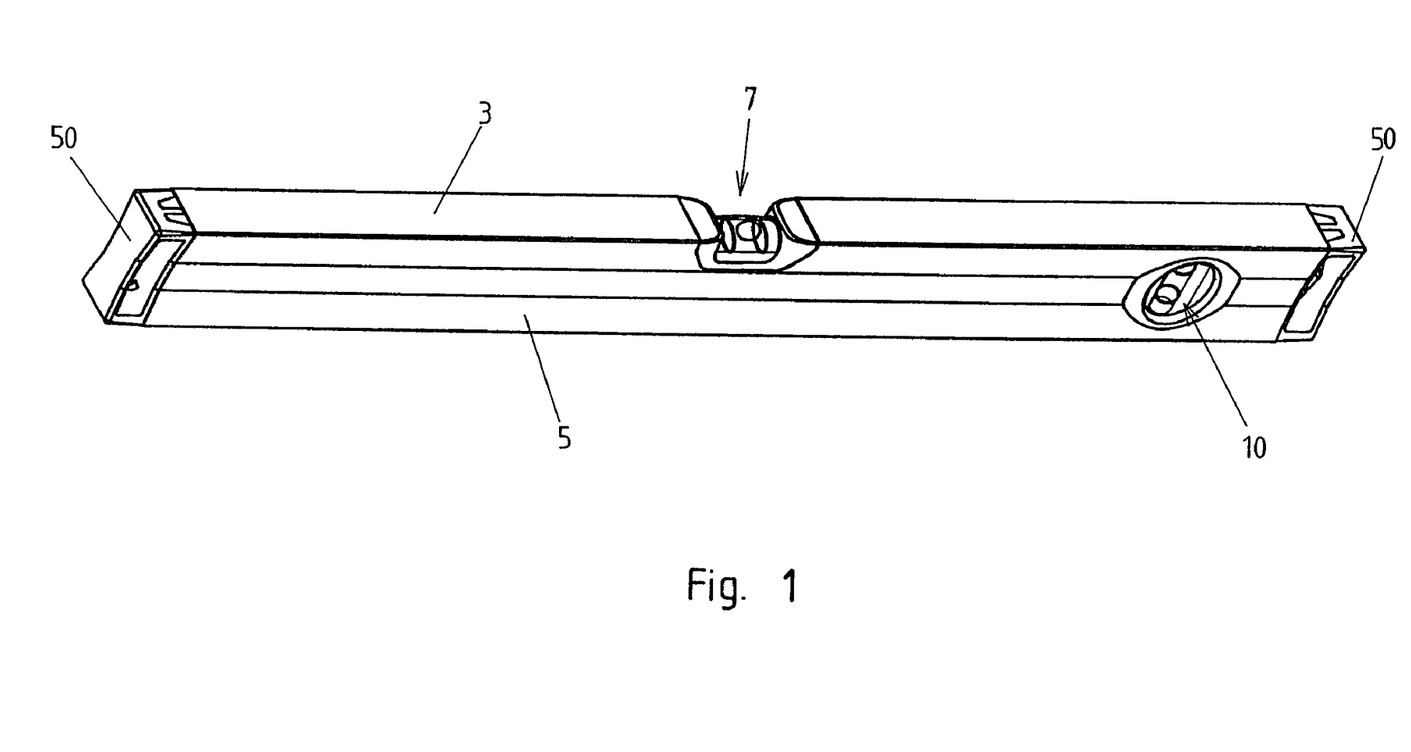
FIG. 1 is a perspective illustration of a first embodiment of the level according to the invention.
Figure 2:
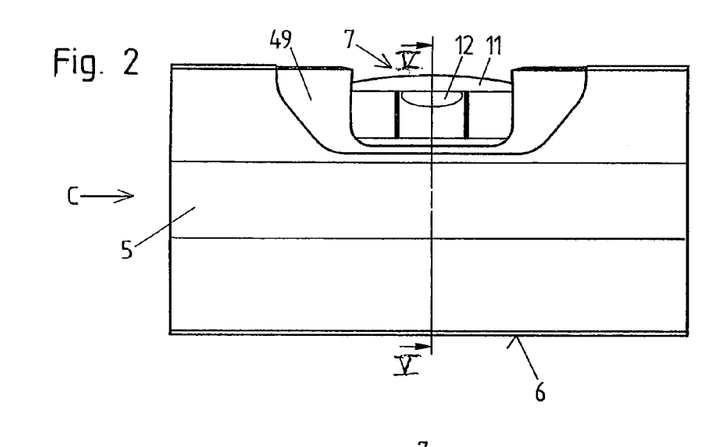
FIG. 2 is a side view of a section of the level in the area of the horizontal vial.
Figure 3:
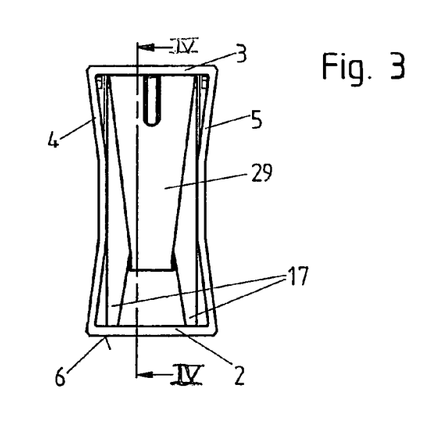
FIG. 3 is a view in the axial direction as indicated by arrow C in FIG. 2.
Figure 4:
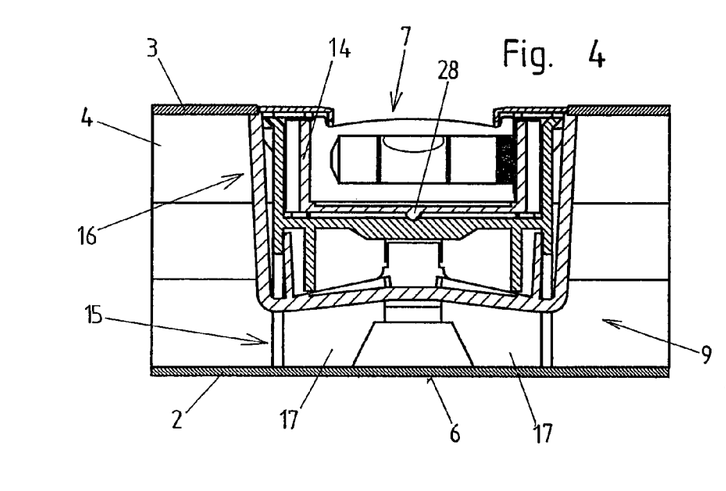
FIG. 4 is a vertical longitudinal section along the section line IV—IV in FIG. 3.
Figure 5:
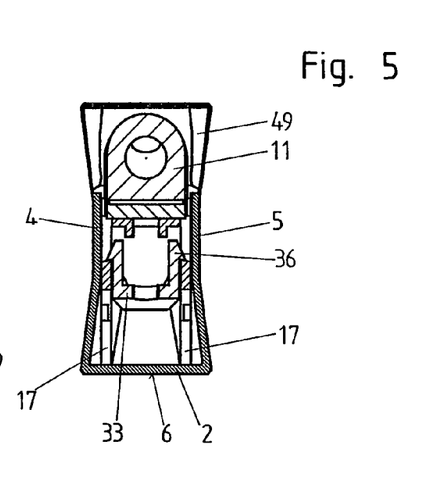
FIG. 5 is a cross-section along the section line V—V of FIG. 2.
Figure 6:
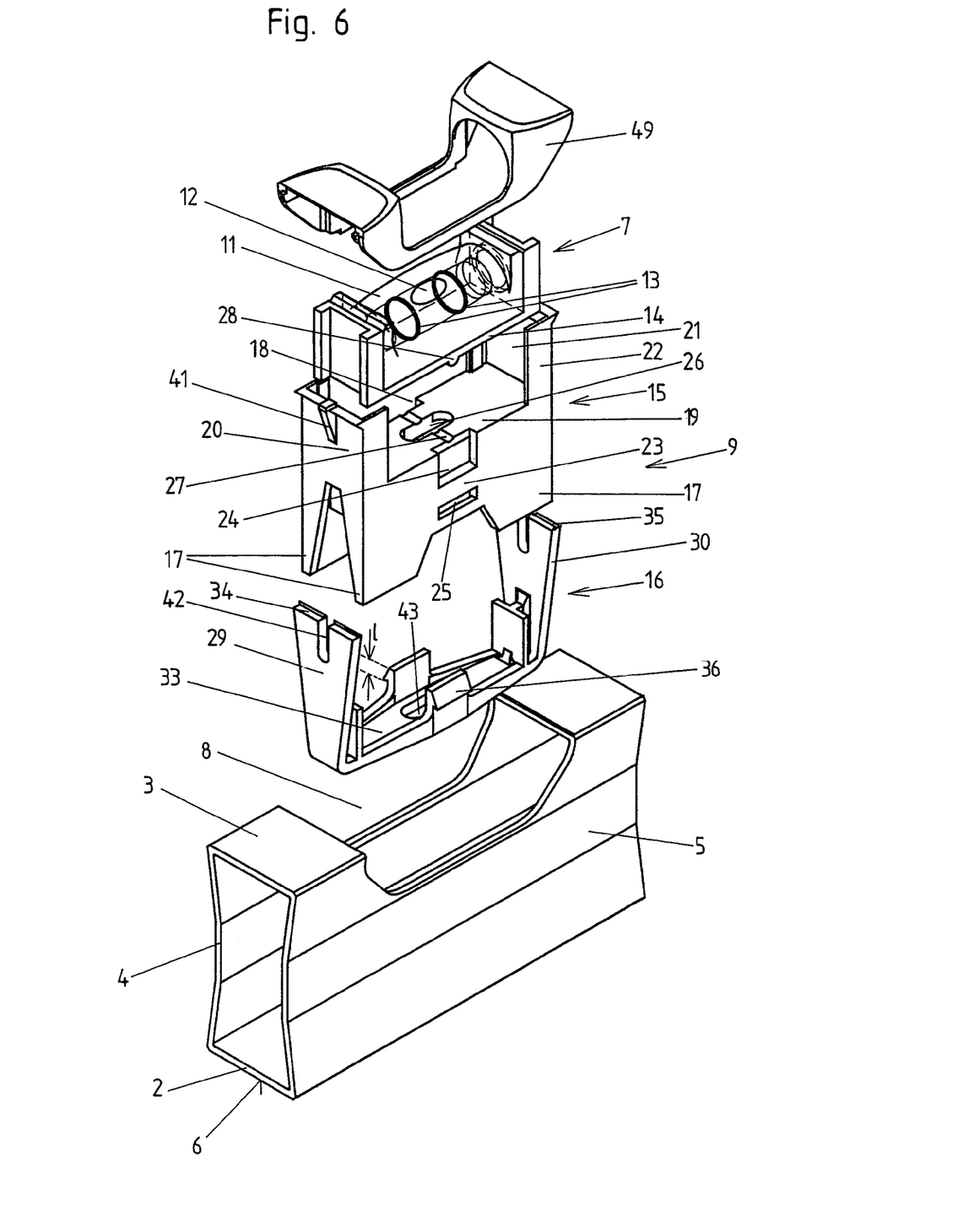
FIG. 6 is an exploded view of the parts of the central section of the level according to FIG. 2.
Figure 7:
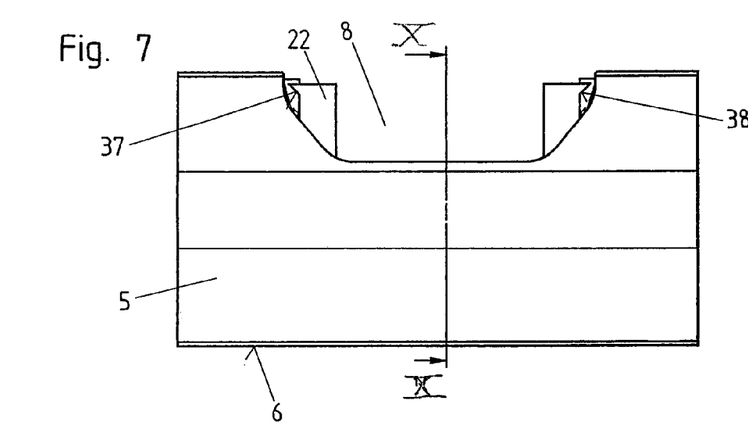
FIG. 7 is a side view corresponding to FIG. 2 during mounting of the securing device (before locking of the clamping part on the vial holder)
Figure 8:
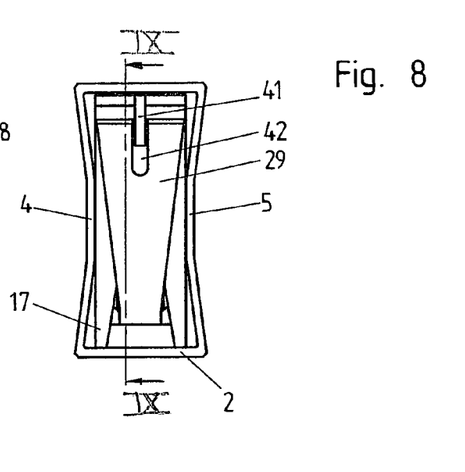
FIG. 8 is a view analog to FIG. 3 in the mounted state shown in to FIG. 7.
Figure 9:
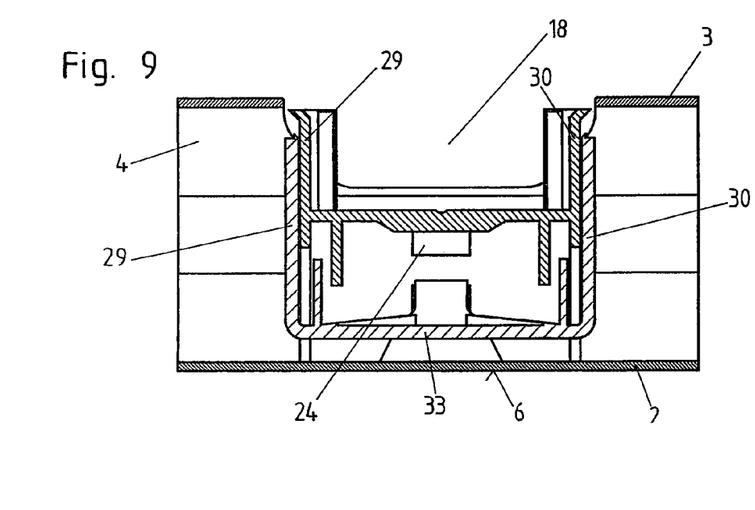
FIG. 9 is a vertical longitudinal section view along the section line IX—IX of FIG. 8.
Figure 10:
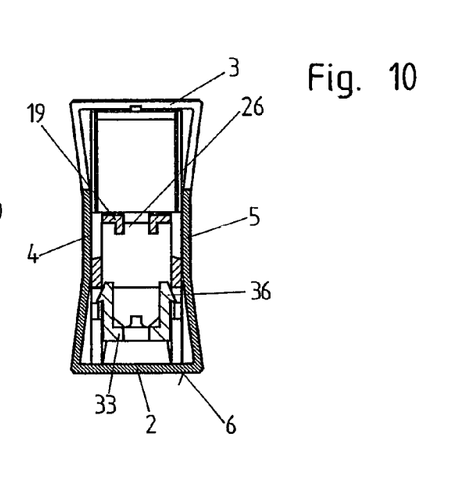
FIG. 10 is a cross section along the line X—X of FIG. 7.
Figure 11:
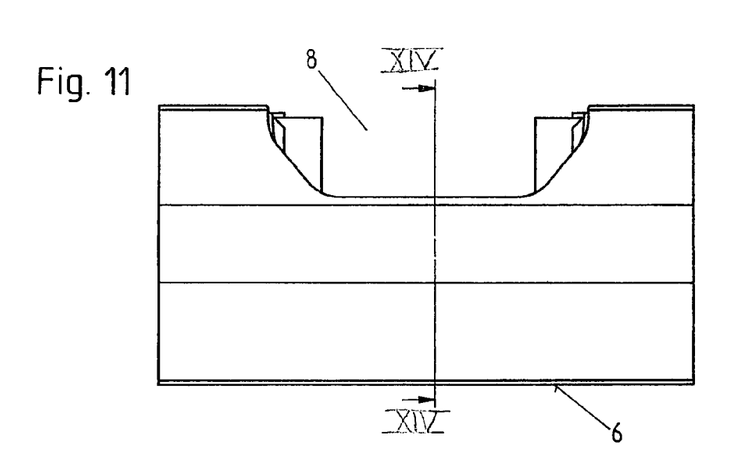
FIG. 11 is an illustration corresponding to FIG. 7 showing the clamping part and the vial holder in the locked state.
Figure 12:
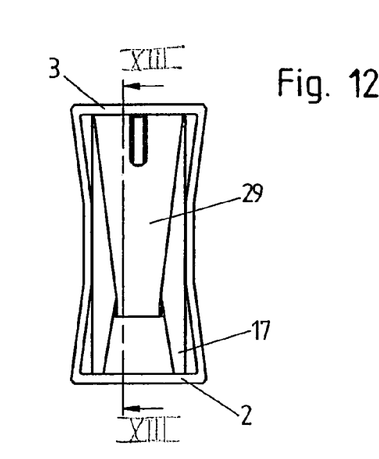
FIG. 12 is an illustration corresponding to FIG. 8 showing the clamping part and the vial holder in the locked state.
Figure 13:
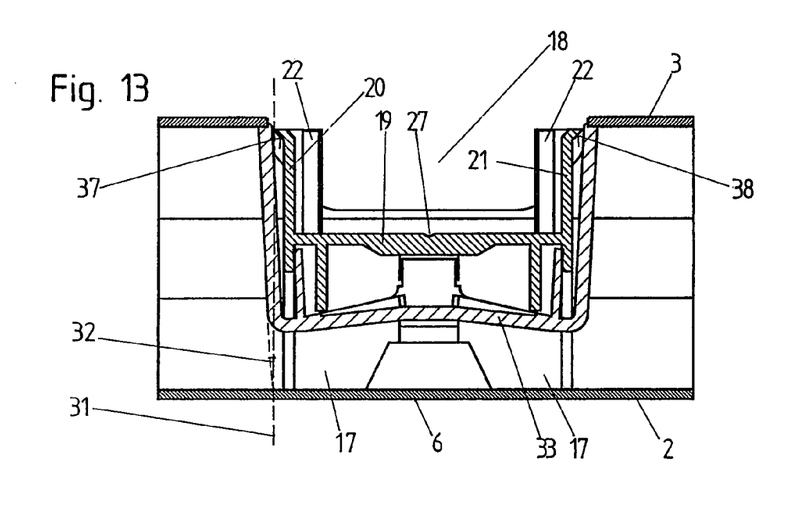
FIG. 13 is an illustration corresponding to FIG. 9 showing the clamping part and vial holder in the locked state in a section view along section line XIII—XIII of FIG. 12.
Figure 14:
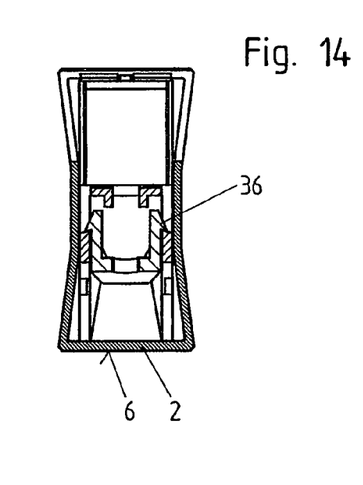
FIG. 14 is an illustration corresponding to FIG. 10 showing the clamping part and the vial holder in the locked state in a section view along section line XIV—XIV of FIG. 11.

The connecting leg 33 is flexible (elastically bendable) and in the mounted state of the securing device 9 it is elastically bent as illustrated in FIGS. 4 and 13.

In the mounted state of the securing device 9, the connecting leg 33 is positioned between the two support legs 17 arranged at the two longitudinal sides of the bottom part 19. The arms 29, 30 extend on both sides of the vial holder when viewed in vertical longitudinal section (FIGS. 4 and 13).

Additional guiding slants 37, 38 are arranged at the end members 20, 21 of the vial holder 15 and cooperate with the arms 29, 30. When the clamping part 16 is moved into the mounted position of the securing device 9, the slants 37, 38 deflect the free ends 34, 35 of the arms 29, 30 somewhat in the direction toward the ends 39, 40 of the level body 1 in order to move the free ends 34, 35 of the arms 29, 30 into a contact position at the top wall 3 in the area that is adjacent to window opening 8. The guiding slants 37, 38 are provided at the outer sides of the end members 20, 21 that are facing away from one another and are in particular located in the area of the ends facing away from the bottom part 19.

On the outer sides of the end members 20, 21 additional guide noses 41 are arranged that cooperate with guide grooves 42 in the arms 29, 30.

The connecting leg 33 has a through opening 43 that is aligned in the mounted state of the securing device 9 with a through opening 26 in the bottom part 19.

Figure 15:
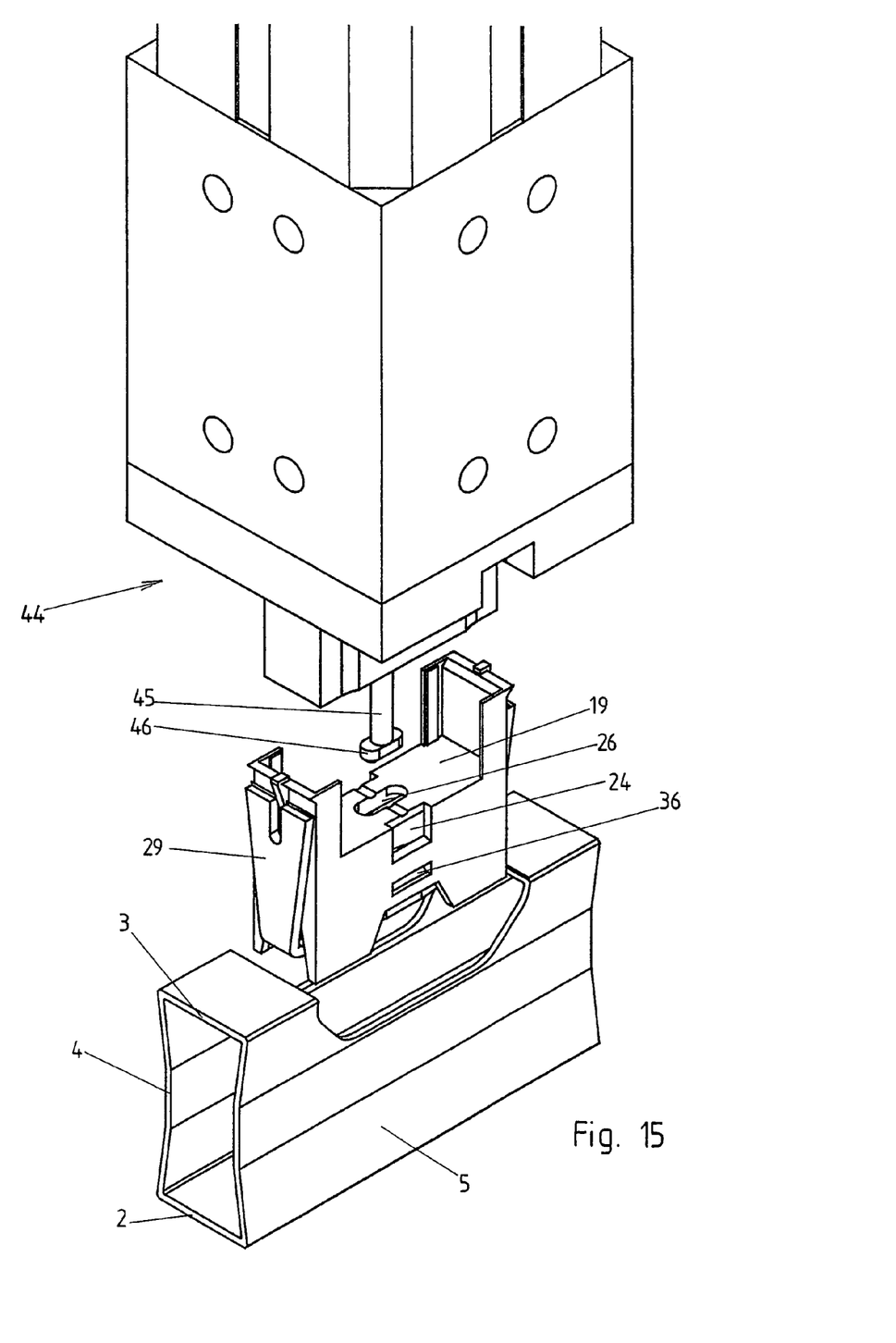
FIG. 15 is a perspective illustration during mounting with a mounting tool.

For mounting the securing device, the clamping part 16 is inserted with its hook parts 36 into the second locking recesses 25 as illustrated in FIG. 15. Subsequently, the parts 15, 16 connected to one another in this way are inserted into the window opening 8 until the support legs 17 of the vial holder 15 rest on the bottom wall 2 (compare FIG. 7 through 10). Subsequently, the clamping part 16 is pulled in the direction toward the top wall 3 until the hook parts 36 lock in the first locking recesses 24. The clamping part 16 is now supported with the free ends 34, 35 of its arms 29, 30 on the inner side of the top wall 3 and is elastically pretensioned so that the vial holder 15 is forced against the bottom wall 2. The securing device 9 is thus clamped between the top wall 3 and the bottom wall 2 (compare FIGS. 11 through 14).

Subsequently, the horizontal vial 7 is inserted into the receptacle 18 of the vial holder 15 and can swivel like a rocker about the contact line or part-cylindrical contact surface of the pivot stay 28 within the groove 27. After exact adjustment of the horizontal vial 7 in the vial holder 15, the horizontal vial 7 is fixed in the vial holder 15 by providing a rigid connection between the two parts, for example, by gluing or welding.

Moreover, a cover 49 is placed thereon and optionally also glued thereto; the cover 49 covers the transition area between the horizontal vial 7 and the edge of the window opening 8.

A mounting tool 44 for mounting the vial holder is illustrated in an exemplary fashion in FIG. 15. The mounting tool 44 has a head 46 mounted on a shaft 45 that is adjustable axially and rotatable about its longitudinal axis. In one rotary position of the shaft 45, illustrated in FIG. 15, the head 46 can be guided through the through openings 26, 43 in the bottom part 19 and in the connecting leg 33. Subsequently, the shaft 45 is rotated by 90° about the longitudinal axis so that the head 46 engages the edge of the through opening 43 in the connecting leg 33. Subsequently, the shaft 45 is retracted axially (so that the head 46 is moved in the direction toward the top wall 3) until the hook parts 36 lock in the first locking recesses 24.

Figure 16:
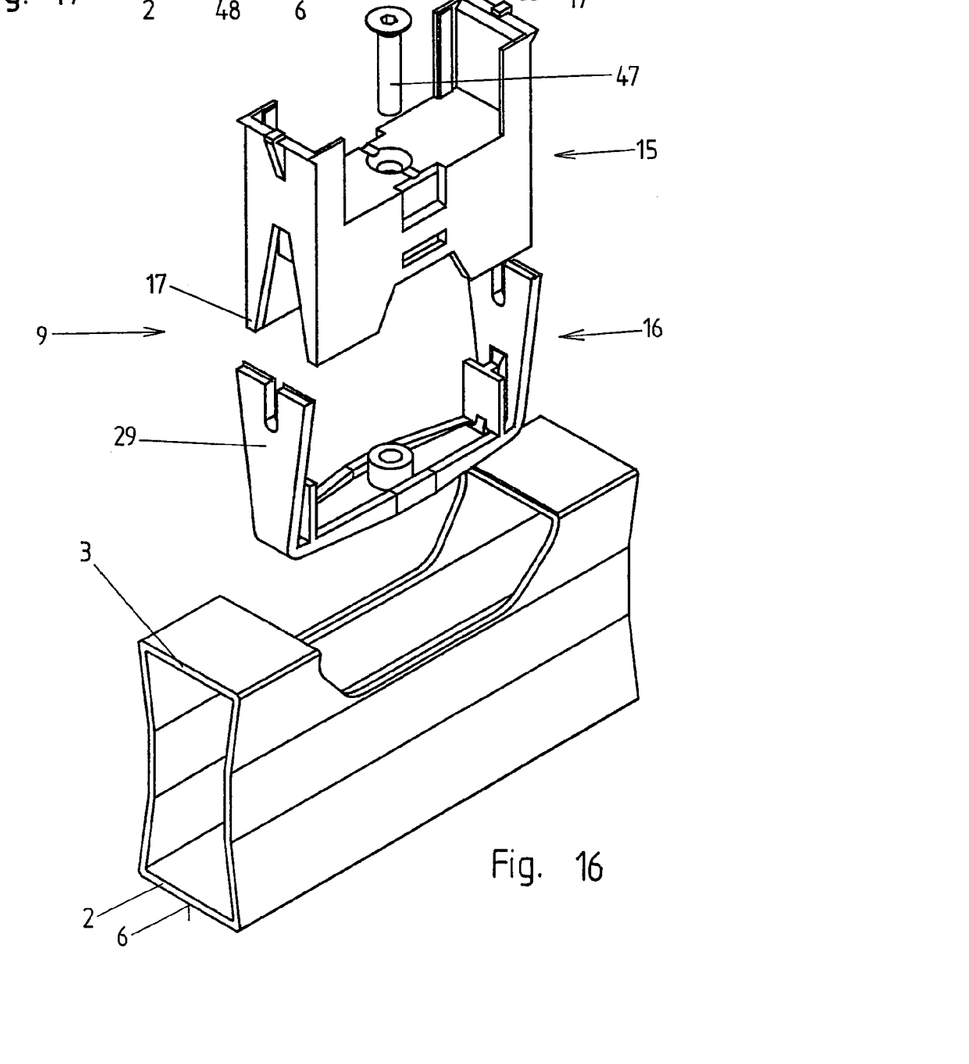
FIG. 16 is a perspective illustration of a second embodiment of the invention.

A further embodiment of the invention is illustrated in FIG. 16. For tensioning the securing device 9 in the level body 1, a clamping screw 47 is provided. By means of the clamping screw 47 the clamping part 16 is moved, after insertion of the securing device into the window opening 8, in the direction toward the top wall 3 and clamped by being supported with the free ends of its arms 29, 30 on the inner side of the top wall 3 so that the vial holder 15 is forced against the bottom wall 2.

Figure 17:
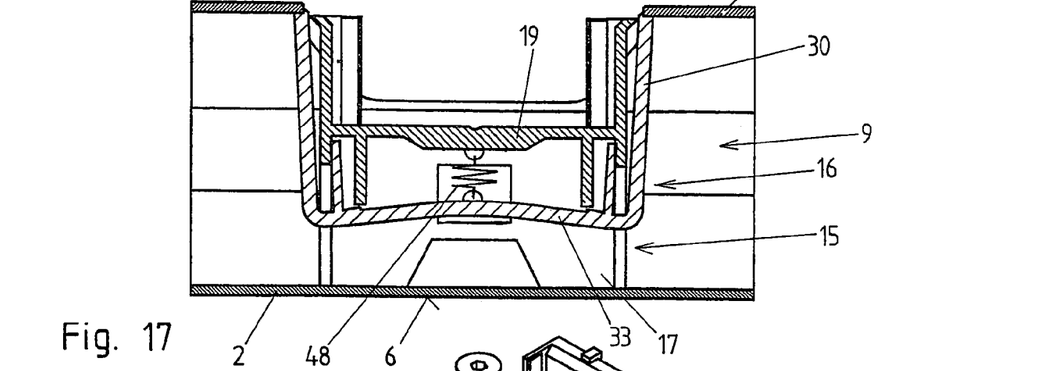
FIG. 17 is a vertical longitudinal center section analog to FIG. 13 of a third embodiment of the invention.

A further embodiment of the invention is illustrated in FIG. 17. A spring 48 that interacts with the bottom part 19 of the vial holder 15 and the connecting leg 33 of the clamping part 16 is provided and is embodied as a tension spring. For insertion of the securing device 9 into the window opening 8, the spring 48 is tensioned to such an extent that the free ends of the arms 29, 30 are positioned underneath the guiding slants 37, 38. For this purpose, a suitable tool can be used that spaces the connecting leg 33 at a suitable spacing relative to the bottom part 19. After insertion into the window opening 8 the tool releases the parts so that the spring 48 pulls the connecting leg 33 in the direction toward the top wall so that the free ends of the arms 29, 30 are forced by the pretension of the spring 48 against the inner side of the top wall 3 and the vial holder 15, in turn, is pressed against the bottom wall 2. The clamping part 16 and the connecting leg 33 of the clamping part 16 can be of a non-elastic configuration in this embodiment.

Different modifications of the illustrated embodiment are conceivable and possible without departing from the scope of the invention. For example, it is conceivable and possible to employ more than one clamping part and the clamping part or clamping parts can also a have a shape that differs from the illustrated bracket shape; however, it is preferred that the clamping part or clamping parts, viewed in a longitudinal direction of the level body, contact on either side of the window opening 8 the inner side of the top wall 3. The window opening 8 can also be smaller or greater than those in the illustrated embodiments in which the window opening comprises a recess in the top wall 3 and in the upper sections of the sidewalls 4, 5 adjoining the top wall 3.

In the illustrated embodiments the clamping part 16 is moveable relative to the vial holder 15 parallel to the normal line 31 to the measuring surface 6. A movability at an angle to the normal line 31 is conceivable also wherein this angle is preferably less than 45°.

As is disclosed in the above description, the scope of the invention is not limited to the illustrated embodiments but is to be determined with reference to the attached claims together with the full range of possible equivalents. While the above description and the drawings illustrate the invention, a person skilled in the art will be aware that different modifications of the invention can be carried out without departing from the true scope and range of the invention.

While specific embodiments of the invention have been shown and described in detail to illustrate the inventive principles, it will be understood that the invention may be embodied otherwise without departing from such principles.

What is claimed is:

1. A level comprising:
a level body comprised of a hollow profiled section having a bottom wall whose underside forms a measuring surface and further having a top wall and sidewalls, the sidewalls connecting the bottom wall and the top wall;
the level body having a window opening;
a horizontal vial for horizontal measurement, wherein the horizontal vial is arranged in the window opening of the level body;
a securing device for mounting the horizontal vial within the level body, wherein the securing device comprises a vial holder, in which the horizontal vial is secured, and at least one clamping part that is movable relative to the vial holder for clamping the securing device in the level body;
wherein in the mounted state of the securing device the at least one clamping part is supported on an inner side of the top wall and the vial holder is pressed against an inner side of the bottom wall;
wherein the clamping part comprises two arms and a connecting leg connecting the two arms to one another, wherein the two arms in the mounted state of the securing device are positioned at an angle of less than 45 E relative to a normal line to the measuring surface, wherein free ends of the arms remote from the connecting leg, when viewed in a vertical longitudinal section of the level body, are supported on opposed sides of the window opening on the inner side of the top wall.

2. The level according to claim 1, wherein the arms in the mounted state of the securing device are positioned at an angle of less than 20 E to the normal line.

3. The level according to claim 1, wherein the arms, viewed in a vertical longitudinal section of the level body, extend on opposed sides of the vial holder.

4. The level according to claim 1, wherein the vial holder has support legs and wherein the connecting leg is positioned between the support legs of the vial holder, wherein the support legs of the vial holder, viewed in a cross-section of the level body, are positioned on opposed sides of the connecting leg and have their free ends pressed against the inner side of the bottom wall.

5. The level according to claim 1, wherein the connecting leg has at least one hook part and the vial holder has at least one first locking recess, wherein the at least one hook part, in the mounted state of the securing device, is snapped into the at least one first locking recess of the vial holder.

6. The level according to claim 5, wherein the at least one hook part is arranged in a central area of the connecting leg relative to a longitudinal extension of the connecting leg.

7. The level according to claim 5, wherein two of the at least one hook part and two of the at least one first locking recess are provided, wherein in a crosssectional view of the level body the two hook parts are located on opposed longitudinal sides of the connecting leg and are snapped into the two first locking recesses.

8. The level according to claim 5, wherein the vial holder has at least one second locking recess for the at least one hook part, wherein the at least one hook part engages the at least one second locking recess in a pre-locking position of the clamping part upon insertion of the securing device into the window opening.

9. The level according to claim 1, wherein the vial holder has guiding slants interacting with the arms of the clamping part, wherein the guiding slants, upon movement of the clamping part in a direction toward the top wall, deflect the free ends of the arms in a direction toward ends of the level body so that the free ends contact lateral areas of the top wall adjacent to the window opening.

10. The level according to claim 9, wherein the vial holder has end members having outer sides facing away from one another and wherein the guiding slants are arranged on the outer sides at ends of the end members facing the top wall in the mounted state of the securing device.

11. The level according to claim 1, wherein the connecting leg is flexible and in the mounted state of the securing device is elastically bent.

12. A level comprising:
a level body comprised of a hollow profiled section having a bottom wall whose underside forms a measuring surface and further having a top wall and sidewalls, the sidewalls connecting the bottom wall and the top wall;
the level body having a window opening;
a horizontal vial for horizontal measurement, wherein the horizontal vial is arranged in the window opening of the level body;
a securing device for mounting the horizontal vial within the level body, wherein the securing device comprises a vial holder, in which the horizontal vial is secured, and at least one clamping part that is movable relative to the vial holder for clamping the securing device in the level body;
wherein in the mounted state of the securing device the at least one clamping part is supported on an inner side of the top wall and the vial holder is pressed against an inner side of the bottom wall;
wherein in the mounted state of the securing device the at least one clamping part is secured on the vial holder by a snap connection.

13. A level comprising:
a level body comprised of a hollow profiled section having a bottom wall whose underside forms a measuring surface and further having a top wall and sidewalls, the sidewalls connecting the bottom wall and the top wall;
the level body having a window opening;
a horizontal vial for horizontal measurement, wherein the horizontal vial is arranged in the window opening of the level body;
a securing device for mounting the horizontal vial within the level body, wherein the securing device comprises a vial holder, in which the horizontal vial is secured, and at least one clamping part that, for clamping the securing device in the level body, is movable relative to the vial holder in a direction that is positioned at an angle of less than 45° to a normal line to the measuring surface;
wherein in the mounted state of the securing device the at least one clamping part is supported on an inner side of the top wall and presses the vial holder against an inner side of the bottom wall;
wherein the at least one clamping part is movable in a direction that is positioned at an angle of less than 45E to a normal line to the measuring surface.

14. The level according to claim 13, further comprising at least one clamping screw for clamping the securing device in the level body, wherein the clamping screw acts between the vial holder and the at least one clamping part.

15. The level according to claim 13, further comprising at least one spring for clamping the securing device in the level body, wherein the at least one spring acts between the vial holder and the at least one clamping part.

16. The level according to claim 13, wherein the direction in which the at least one clamping part is movable parallel to the normal line.

17. The level according to claim 13, wherein the vial holder has a receptacle for the horizontal vial, wherein the receptacle is comprised of a bottom part delimiting the receptacle in a direction toward the bottom wall of the level body and end members delimiting the receptacle in a direction toward ends of the level body.

18. The level according to claim 17, wherein the vial holder has support legs that project from the bottom part in the direction toward the bottom wall of the level body.

19. The level according to claim 18, wherein the support legs are provided on both longitudinal edges of the bottom part.

20. A method for mounting a horizontal vial in a level that comprises a level body comprised of a hollow profiled section having a bottom wall whose underside forms the measuring surface and further having a top wall and sidewalls connecting the bottom wall and the top wall, the method comprising the steps of:
inserting a securing device, comprising a vial holder for holding a vial and at least one clamping part, into a window opening of the level body;
subsequently moving the at least one clamping part relative to the vial holder in a direction positioned at an angle of less than 45E relative to a normal line to a measuring surface of the bottom wall for clamping the securing device in the level body and moving the at least one clamping part from a first position spaced from an inner side of the top wall into a second position pressed against the inner side of the top wall, wherein in the second position the at least one clamping part forces the vial holder against an inner side of the bottom wall and the securing device is clamped between the top wall and the bottom wall.

21. The method according to claim 20, further comprising the step of locking the at least one clamping part and the vial holder together for clamping between the top wall and the bottom wall.

22. The method according to claim 21, wherein the vial holder and the at least one clamping part are inserted in a pre-locked state into the window opening and subsequently are clamped and transferred into the locked state by a mounting tool, the mounting tool comprising a head mounted on a shaft that is movable in an axial direction and that is rotatable about a longitudinal axis of the shaft, by pushing the head of the mounting tool through a through opening of the vial holder and a through opening of the at least one clamping part and engaging with the head edges of the through opening of the clamping part by rotating the shaft about the longitudinal axis and subsequently retracting the head.

* * * * *